United States Patent

Watabe

[19]

[11] Patent Number: 6,068,792
[45] Date of Patent: May 30, 2000

[54] LIQUID CRYSTALLINE POLYMER FILM

[75] Inventor: Junji Watabe, Chigasaki, Japan

[73] Assignee: Nippon Oil Company Limited, Tokyo, Japan

[21] Appl. No.: 09/132,393

[22] Filed: Aug. 11, 1998

[51] Int. Cl.[7] .......................... C09K 19/52; C09K 19/12
[52] U.S. Cl. ................. 252/299.01; 252/299.66
[58] Field of Search .................... 252/299.01, 299.66

[56] References Cited

U.S. PATENT DOCUMENTS

| | | |
|---|---|---|
| 5,081,221 | 1/1992 | Watanabe ............................ 528/308 |
| 5,316,693 | 5/1994 | Yuasa et al. ...................... 252/299.01 |
| 5,326,496 | 7/1994 | Iida et al. ......................... 252/299.01 |
| 5,397,503 | 3/1995 | Yuasa et al. ...................... 252/299.01 |
| 5,472,635 | 12/1995 | Iida et al. ......................... 252/299.01 |
| 5,844,652 | 12/1998 | Takatori ............................... 349/139 |
| 5,920,301 | 7/1999 | Sakamoto et al. ..................... 345/96 |

*Primary Examiner*—C. H. Kelly
*Attorney, Agent, or Firm*—Scully, Scott, Murphy & Presser

[57] ABSTRACT

A liquid crystalline polymer film formed from a liquid crystalline polymer the orientation structure of which is smectic CA phase fixed. In this orientation structure the angle between C-director in the liquid crystalline polymer and the film plane is not zero. The liquid crystalline polymer film is useful in optical and dynamic applications.

10 Claims, 3 Drawing Sheets

(a)

(b)

(c)

LIQUID CRYSTALLINE POLYMER FILM

FIELD OF THE INVENTION

The present invention relates to a liquid crystalline polymer film useful in optical and dynamical applications.

BACKGROUND OF THE INVENTION

Liquid crystalline polymer films are used in various optical and dynamical applications because of their unique optical and dynamical properties based on phase structures and orientation structures of liquid crystal molecules. Characteristics of such liquid crystalline polymer films differ according to phase structures and orientation structures of liquid crystal molecules. Liquid crystalline polymers can be classified in terms of phase structures into four generally known types which are nematic, cholesteric, smectic and discotic liquid crystals. Utilizing properties peculiar to these phase structures, liquid crystalline polymer films are used in various applications. For example, in JP3-291601A is disclosed a technique for using a film of a nematic liquid crystalline polymer as a retardation plate such as λ/4 plate. In JP3-87720 is disclosed a technique for using a film of a cholesteric liquid crystalline polymer as a compensator for a liquid crystal display. Further, it is known as in JP1-65124A that a film of a smectic liquid crystalline polymer finds use as an optical filter.

As noted above, liquid crystalline polymer films exhibit various characteristics depending on their phase structures. They exhibit different characteristics also according to arrangements of liquid crystal molecules in liquid crystal structures, namely according to orientation structures. Therefore, a liquid crystalline polymer film having such a liquid crystal phase structure or orientation structure so far not known finds a new application and the development of such a film has been keenly desired.

OBJECT OF THE INVENTION

It is an object of the present invention to provide a novel liquid crystalline polymer film useful in optical and dynamical applications, particularly a novel liquid crystalline polymer film using a smectic liquid crystalline polymer.

In the case of smectic liquid crystal, low molecular liquid crystalline compounds are broadly classified into various known phase structures (orientation structures), including smectic $A(S_A)$, $S_B$, $S_C$, $S_D$ and $S_L$ phase. However, as to liquid crystalline polymers (high molecular compounds), there are known only several types of phase structures (orientation structures). Particularly, as to a film in which the phase structure of such liquid crystalline polymer is fixed, there scarcely is known such a film. An optical filter with chiral smectic C phase fixed is merely disclosed in JP64-65124A.

In developing a new liquid crystalline polymer film, the present inventor has noted a liquid crystalline polymer whose phase structure (orientation structures) exhibits a unique smectic $CA(S_{CA})$ phase, among various smectic liquid crystals. $S_{CA}$ phase, like $S_c$ structure, has a layered structure, in which directors of liquid crystal are tilted from a smectic layer normal line and liquid crystal molecules in adjacent smectic layers are tilted in opposite directions. Thus, the phase structure (orientation structures) is unique.

Having made extensive studies, the present inventor accomplished a film of a liquid crystalline polymer exhibiting $S_{CA}$ phase structure and in which the orientation structure of liquid crystal molecules was controlled and fixed in three dimensions.

SUMMARY OF THE INVENTION

The present invention resides in a liquid crystalline polymer film having a fixed orientation structure in $S_{CA}$ phase in which structure the angle between each C-director in the liquid crystalline polymer and a film plane is not zero.

PREFERRED EMBODIMENTS OF THE INVENTION

The liquid crystalline polymer film of the present invention is formed substantially from a liquid crystalline polymer which exhibits a smectic $CA(S_{CA})$ phase. The $S_{CA}$ phase as referred to herein indicates such a liquid crystal phase structure (orientation structures) as is described, for example, in Jpn. J. Appl. Phys., 28, L1265 (1989). This orientation structure is described as $S_{C2}$ in some literatures such as Macromolecules, 21, 278 (1988), ibid., 22, 4083 (1989), Liquid Crystals, 13, 455 (1993), Polym. J. (Japan), 24, 597 (1992), and J. Phys. II (France), 2, 1237 (1992).

$S_{CA}$ phase is one mode of many liquid crystal structures (orientation structures) formed by smectic liquid crystal. In this connection, such an orientation structure as in FIG. 1(a) in which all of mesogens are tilted in the same direction, is generally called smectic $C(S_C)$ phase (orientation structures). On the other hand, the $S_{CA}$ phase as referred to herein takes such an orientation structure as in FIG. 1(b) in which mesogens in adjacent layers are tilted in opposite directions. In FIG. 1, the orientation vector means a unit vector which represents a molecular orientation direction, the C-director means a unit vector which faces in the same direction as a vector obtained by projecting an orientation vector onto a smectic plane, and the tilt angle (θ) means an angle between a smectic layer normal line and an orientation vector.

In the liquid crystalline polymer film of the present invention, the angle (φ) between each C-director and a film plane is not zero, but is usually not less than 10 degrees, preferably not less than 30 degrees, and more preferably not less than 60 degrees, in terms of an absolute value. Such a phase structure (orientation structures) as shown in FIG. 2 in which the angle φ is 90 degrees; is also included in the present invention. In the same structure, a smectic layer normal line lies in a film plane.

The tilt angle (θ) in the liquid crystalline polymer is usually in the range of 10 to 80 degrees, preferably 30 to 70 degrees.

Description is now directed to the liquid crystalline polymer used in the present invention. The liquid crystalline polymer is not specially limited insofar as it exhibits $S_{CA}$ phase. For example, there may be used a main chain type or a side chain type liquid crystalline polymer, or a mixture thereof. Particularly, it is desirable to use a main chain type liquid crystalline polymer. In preparing such a liquid crystalline polymer, there is no special limitation on the bonding form. For example, it is not always necessary that such atoms as oxygen and nitrogen atoms be contained in the main chain. It is possible that all the atoms contained in the main chain are carbon atoms.

As examples of main chain type liquid crystalline polymers, mention may be made of polyimides, polyamides, polyesters, polyethers, polycarbonates, polyesterimides, and polythioethers. Particularly, polyimides and polyesters are preferred because they can be prepared easily.

The following description is now provided about liquid crystalline polymers which exhibit $S_{CA}$ phase. As examples of such liquid crystalline polymers, mention may be made of main chain type liquid crystalline polymers in which a mesogen moiety formed from a highly linear aromatic group and a bend chain moiety formed from an aliphatic chain are bonded in an alternate manner. Typical examples of the mesogen moiety are biphenyl and terphenyl, while a straight-chain aliphatic group is a typical example of the bend chain moiety. Particularly preferred are those wherein the number of atoms contained in the main chain is an odd number.

Examples of liquid crystalline polymers employable in the present invention will be given below, which polymers have such a chemical structure as the following general formula (1):

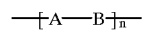

where A represents a mesogen moiety and B represents a bend chain moiety.

As the mesogen moiety, a divalent group having at least 2, preferably 2 to 10, benzene rings arranged linearly is preferred. As the bend chain moiety, a straight-chain aliphatic group such as, for example, an alkylene or a mono- or poly-oxyalkylene group is preferred, with the number of atoms in the main chain being preferably an odd number and in the range of 2 to 21.

The following examples are mentioned as concrete examples of the mesogen moiety:

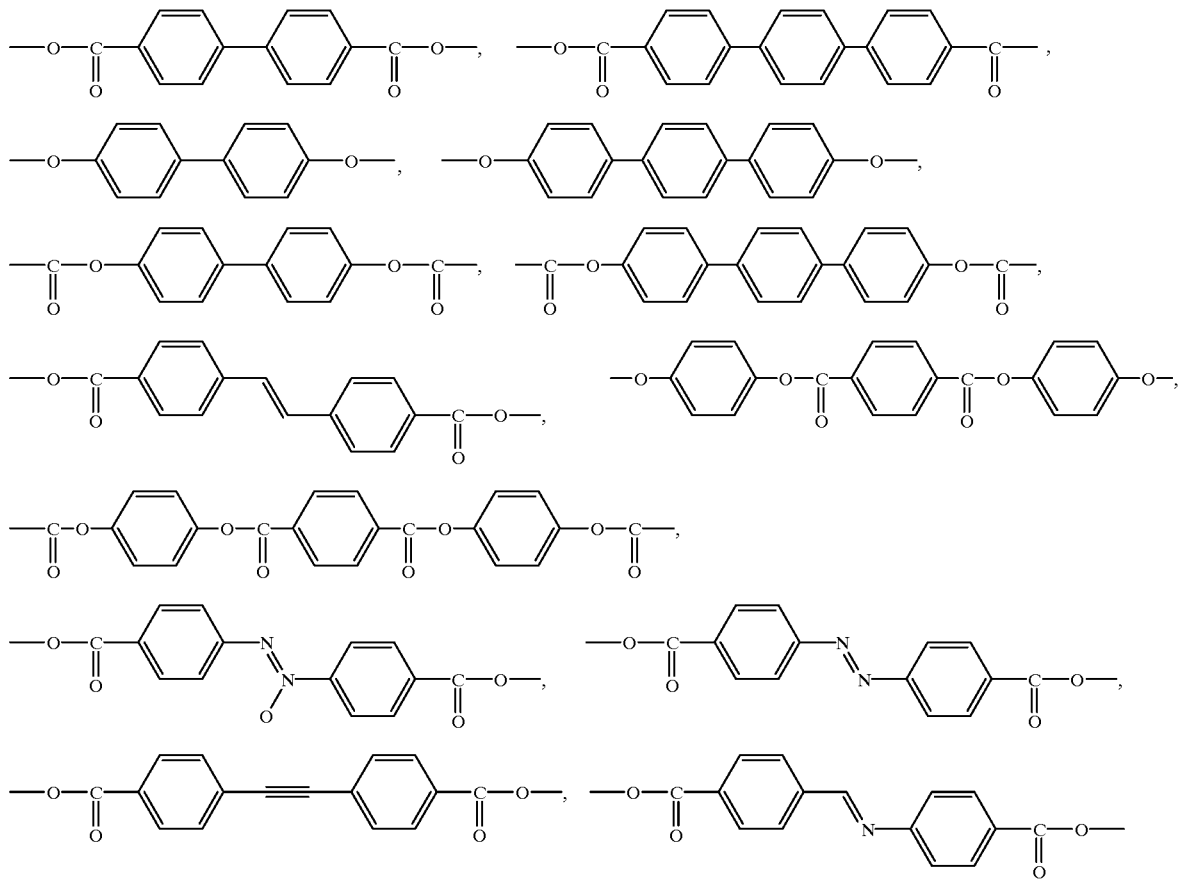

and the like (A),

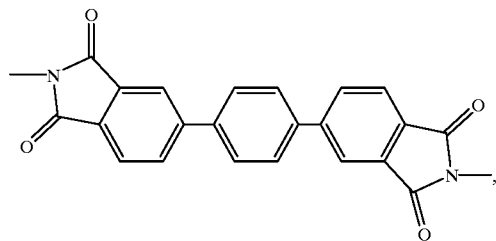

-continued

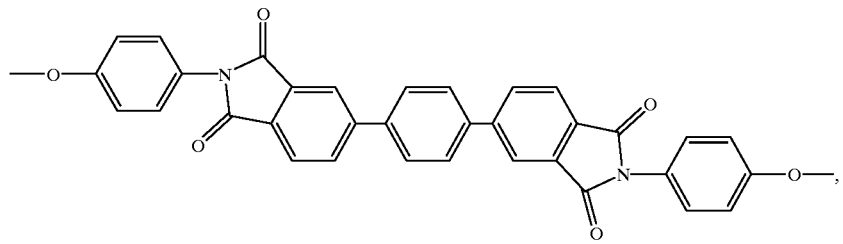

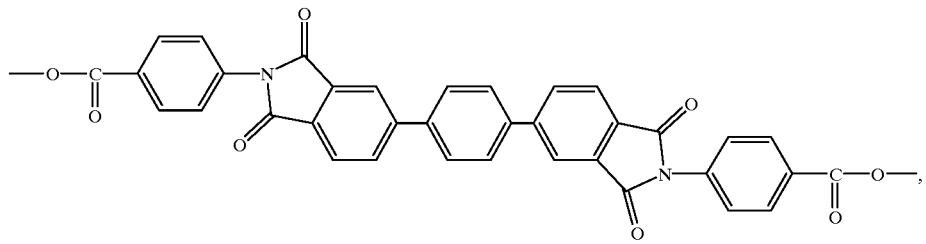

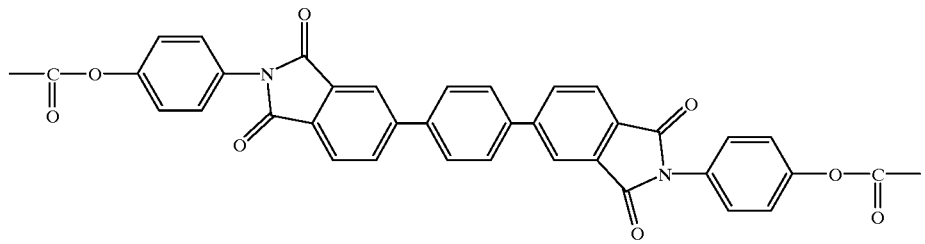

and the like (Group A),

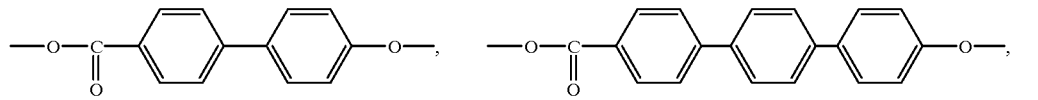

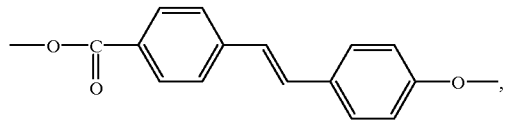
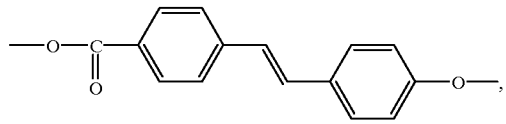

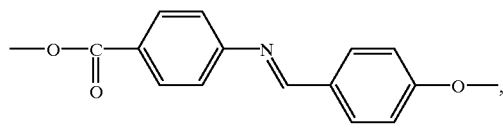
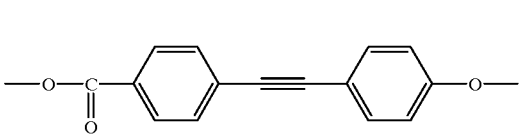

and the like (Group B).

As examples of the bent chain moiety, mention may be made of the following:

where n stands for an integer of 2 to 21. In the case of combining this bent chain moiety with the mesogen moiety of the above Group (A), n is preferably an odd number of 3 to 21, while in the case of combining with the mesogen moiety of the above Group (B), n is preferably an even number of 2 to 20.

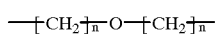

where n is an integer of 2 to 10.

where n is an integer of 2 to 21. In the case of combining with the mesogen of the above Group (A), n is preferably an odd number of 3 to 21.

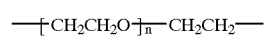

where n is an odd number of 1 to 11.

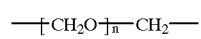

where n is an integer of 1 to 10.

The following are more concrete examples of liquid crystalline polymers which exhibit $S_{CA}$ phase:

In the production of the film, a film forming step and an orientation forming step may be carried out at a time, or both

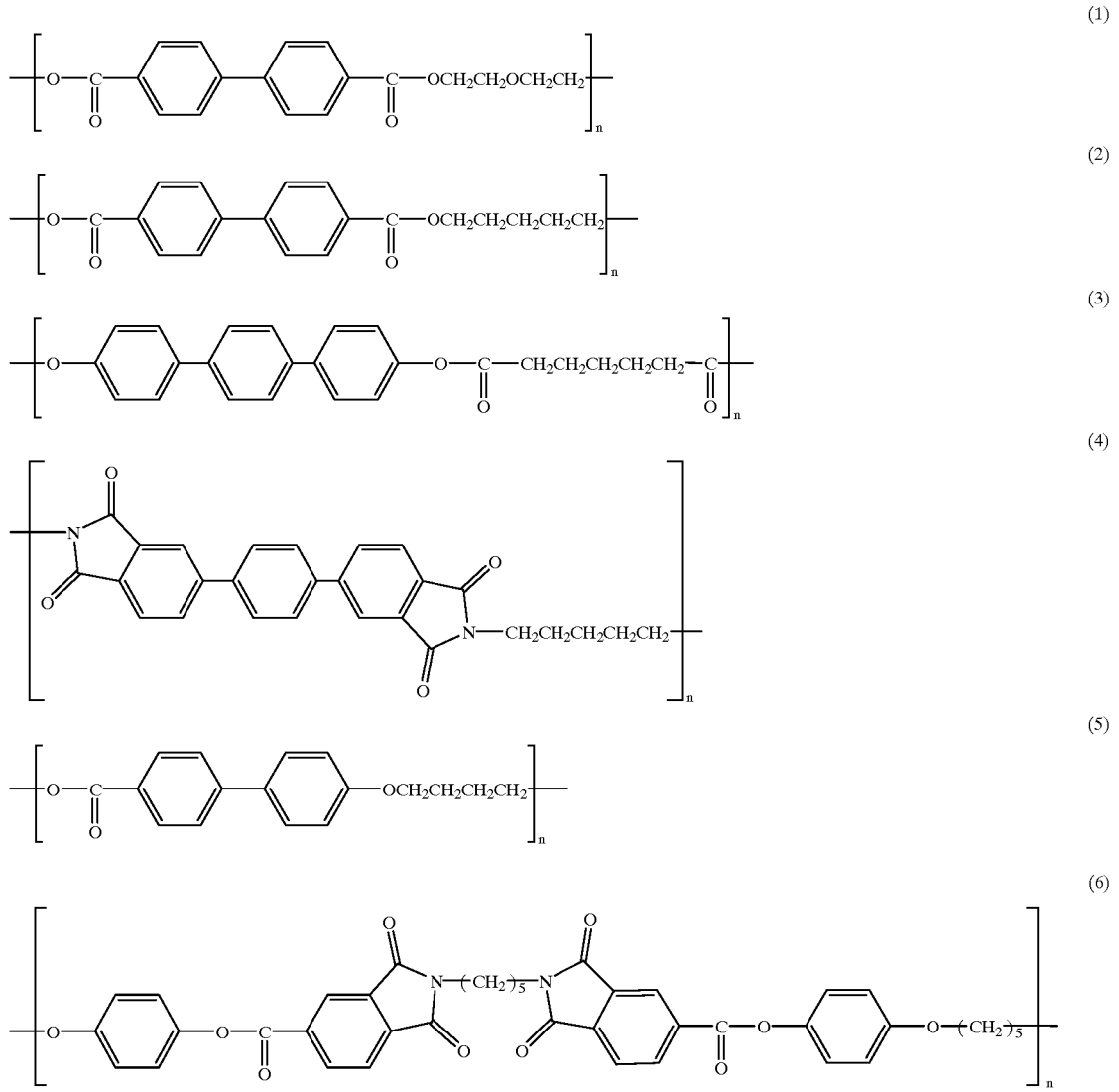

The present invention is not limited at all to the above examples.

Regarding how to prepare the liquid crystalline polymers exemplified above, there is no special limitation. There may be adopted a known method. For example, in the case of a polyester, it may be prepared by an acid chloride process or a melt polymerization method. In the case of adopting a melt polymerization method, sodium acetate or orthotitanate ester may be used as a catalyst, if necessary.

The polymerization degree of each such polymer is evaluated in terms of an intrinsic viscosity which is determined at 30° C. and at a concentration of 0.5 g/dl, using phenol and tetrachloroethane as solvents (weight ratio: 60:40), by means of a Ubbelohde's viscometer. The liquid crystalline polymer used in the present invention is usually in the range of 0.05 to 5.0, preferably 0.1 to 3.0, in terms of the said intrinsic viscosity.

Now, a description will be given of the method for producing the liquid crystalline polymer film of the present invention.

steps may be carried out separately. For example, by stretching the liquid crystalline polymer which is in an isotropic state, it is possible to effect both formation of the film and formation of $S_{CA}$ phase structure (orientation structure). There also may be adopted a method in which film is once formed by an appropriate method, then the film is transformed into an isotropic state and is then subjected to stretching. In this case, no special limitation is imposed on the film forming method. For example, there may be adopted such a publicly known method as casting, melt extrusion, or rolling.

According to one example of a manufacturing method, a liquid crystalline polymer which exhibits $S_{CA}$ phase is subjected to stretching in the temperature region in which it assumes its isotropic state, followed by cooling. The temperature region in which the polymer assumes its isotropic state indicates a temperature region of not lower than the isotropic transition temperature of the film forming polymer. Usually, the temperature region is in the range from the isotropic transition temperature up to a temperature 100° C., preferably 50° C., higher than the isotropic transition temperature.

It is not always necessary that the temperature region for the stretching process be not lower than the isotropic transition temperature. The stretching process may be carried out even in a temperature region in which liquid crystal is not developed in a non-equilibrium condition, for example in supercooling.

If the self-holding property of the film is sufficient, the film alone may be subjected to stretching, but if it is insufficient, the film may be laminated to a suitable substrate and in this retained state the film may be subjected to stretching. As the substrate there may be used, for example, a film of polyethylene, polypropylene, polymethyl methacrylate, polymethyl acrylate, polyvinyl acetate, polyethylene terephthalate, polyethylenenaphthalene dicarboxylate, polybutylene terephthalate, polyimide, polyphenylene sulfide, and polyether sulfone. It is desirable that the substrate and the liquid crystalline polymer film be in a closely contacted state with each other. As to the method for attaining such a closely contacted state, there is no special limitation. For example, separate formations of the polymer film and the substrate film may be followed by lamination under pressure, or after application of a solution of the liquid crystalline polymer onto the substrate film, the thus-coated film may be dried. In this way the liquid crystalline polymer film can be held on the substrate.

After the above stretching process, the liquid crystalline polymer is cooled to room temperature or thereabouts. The cooling may be done forcibly using, for example, water, dry ice, or cold air. But usually a mere contact of the film with air of a normal temperature is satisfactory for this purpose.

The thickness of the film being considered is usually in the range of 0.01 to 100 μm, preferably 0.1 to 50 μm, while the width of the film is three times or more, preferably five times or more, as large as the film thickness, with no special limitation being imposed on its upper limit. In other words, the form generally called yarn, for example a form 1 μm thick by 10 μm, is also included in the liquid crystalline film as referred to herein. It is to be noted that the film width indicates a length in the direction orthogonal to the stretching direction.

In the formation of the liquid crystalline polymer film of the present invention, an appropriate relation between the film thickness and the film width is important in obtaining the liquid crystal phase structure (orientation structure) of the film. If such a relation is not satisfied, it will become difficult to obtain a uniform $S_{CA}$ phase structure (orientation structure).

In the present invention, if there is no fear of impairment in the effect of the resulting liquid crystalline polymer film, a photocrosslinkable monomer, a radial polymerization initiator, and a vulcanizing agent, for example, may be incorporated in the starting liquid crystalline polymer, and the mixture thus obtained may be subjected to the foregoing film forming step and the orientation forming step. After a film having a uniform $S_{CA}$ phase structure (orientation structure) has been formed from the said mixture, the film may be subjected to irradiation using, for example, γ ray or ultraviolet light, or heat treatment, allowing crosslinking to take place and thereby enhancing the strength of the film.

Further, for protection of the film surface, an overcoat layer may be formed on the film surface.

As set forth above, the liquid crystalline polymer film of the present invention is a novel liquid crystalline polymer film having such a unique phase structure (orientation structure) as $S_{CA}$. By utilizing both light scattering characteristic and birefringence characteristic which are expected from the $S_{CA}$, it becomes possible for the film to afford a useful optical material not available so far. An example is a biaxial film which utilizes the point that an orientation vector has a component in the film thickness direction, to control the birefringence in the film normal direction. In this connection, it is a great feature of the liquid crystalline polymer film of the present invention that a biaxial film is obtained by only uniaxial stretching. Moreover, by expansion and contraction of the film of the invention, it is possible to control the index ellipsoid structure and hence possible to use the film in controlling an optical sensor or an optical waveguide.

Further, by introducing a dipole moment-containing group into the mesogen moiety, it becomes possible to impart piezoelectricity and pyroelectricity to the film and thereby use the film as the material of an optical sensor or the like. It also becomes possible to apply the film to dynamic materials which utilize changes in the liquid crystal phase structure (orientation structure) caused by expansion and contraction of the film.

Thus, the liquid crystalline polymer film of the present invention develops the possibility of application to various fields and thus it is very useful.

EXAMPLES

Example 1

The liquid crystalline polymer having the formula:

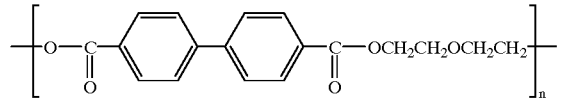

was prepared by subjecting dimethyl biphenyl-4,4'-dicarboxylate and ethylene glycol to a melt polycondensation using isopropyl orthotitanate as catalyst. The polymer was then determined for intrinsic viscosity at 30° C. and at a concentration of 0.5 g/dl, using phenol and tetrachloroethane (weight ratio: 60:40) as solvents, by means of a Ubbelohde's viscometer, to find that the intrinsic viscosity was 1.3 dl/g. As a result of DSC analysis (using Perkin Elmer DSC II) of the liquid crystalline polymer is turned out that the transition from the state of $S_{CA}$ to isotropic state was at 199° C. in a temperature rising stage and that the transition from isotropic state to the state of $S_{CA}$ phase was at 180° C. in a temperature dropping stage.

Using an extruder/stretcher, the liquid crystalline polymer was stretched at a rate of 1 m/sec at 230° C. to form a 0.5 cm wide film. The thickness of the film was 10 μm.

Analysis by X-ray diffraction was conducted to observe the liquid crystal phase structure (orientation structure) of the film. The results obtained are as shown in FIGS. 3 and 4.

FIG. 3(a) is an X-ray diffraction photograph taken by applying X-ray from a side face of the film in a direction perpendicular to the stretched direction. From the photograph there are observed a diffraction image based on smectic layer in the meridian direction and a diffraction image wide but clearly split in the equatorial direction (a diffraction image characteristic in $S_{CA}$ phase structure in which directors change their direction in an alternate manner). FIG. 3(b) is an X-ray diffraction photograph taken by applying X-ray in the film normal direction. From this photograph there are observed a diffraction image based on smectic layer in the meridian direction and a diffraction image wide but concentrated to one point in the equatorial direction. FIG. 3(c) is an X-ray diffraction photograph taken by applying X-ray in parallel with the stretched direction from a side face of the film. From this photograph there no longer is observed any diffraction image based on smectic layer in the meridian direction but is observed an omnidirectionally equal circular, wide diffraction image.

FIG. 4(a) shows the results of having measured changes in diffraction intensity according to azimuth angles under the condition that X-ray was radiated perpendicularly to the stretched direction from a side face of the film and that the diffraction angle was set constant. Front the results is observed a split in two. FIG. 4(b) shows the results of having measured changes in diffraction intensity according to azimuths under the condition that X-ray was radiated in the film normal direction and that the diffraction angle was set constant. From the results is observed no split.

From the above results it turned out that C-directors of the film lie on a plane perpendicular to the film and including the stretched direction and that the smectic CA phase structure (orientation structure) was fixed as in FIG. 2.

Example 2

The same liquid crystalline polymer as in Example 1 was fed into an extruder equipped with a T die having a die lip width of 50 μm and was then melt-extruded at 230° C. at a rate of 2 m/sec into a film having a width of 2 cm and a thickness of 12 μm. For observing the phase structure (orientation structure) of the film, the film was analyzed by X-ray diffraction in the same way as in Example 1 to find that it had such an orientation structure as shown in FIG. 2.

Example 3

The liquid crystalline polymer having the formula:

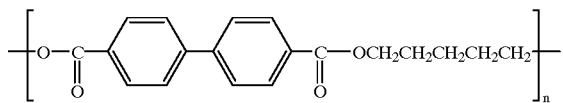

was prepared by subjecting dimethyl biphenyl-4,4'-dicarboxylate and pentanediol to melt polycondensation using isopropyl orthotitanate as catalyst. The liquid crystalline polymer was determined for intrinsic viscosity by the same method as in Example 1 to find that the intrinsic viscosity was 1.4 dl/g.

Using liquid crystalline polymer thus prepared, a film having a width of 0.5 cm and a thickness of 10 μm was formed in the same way as in Example 1. For observing the state of orientation of the film, analysis was made by the same X-ray diffraction as in Example 1. As a result, it turned out that the film had such an orientation structure as shown in FIG. 2.

BRIEF DESCRIPTION OF THE DRAWINGS

FIG. 3 shows X-ray photographs of the film obtained in Example 1, in which:

Figure 1:
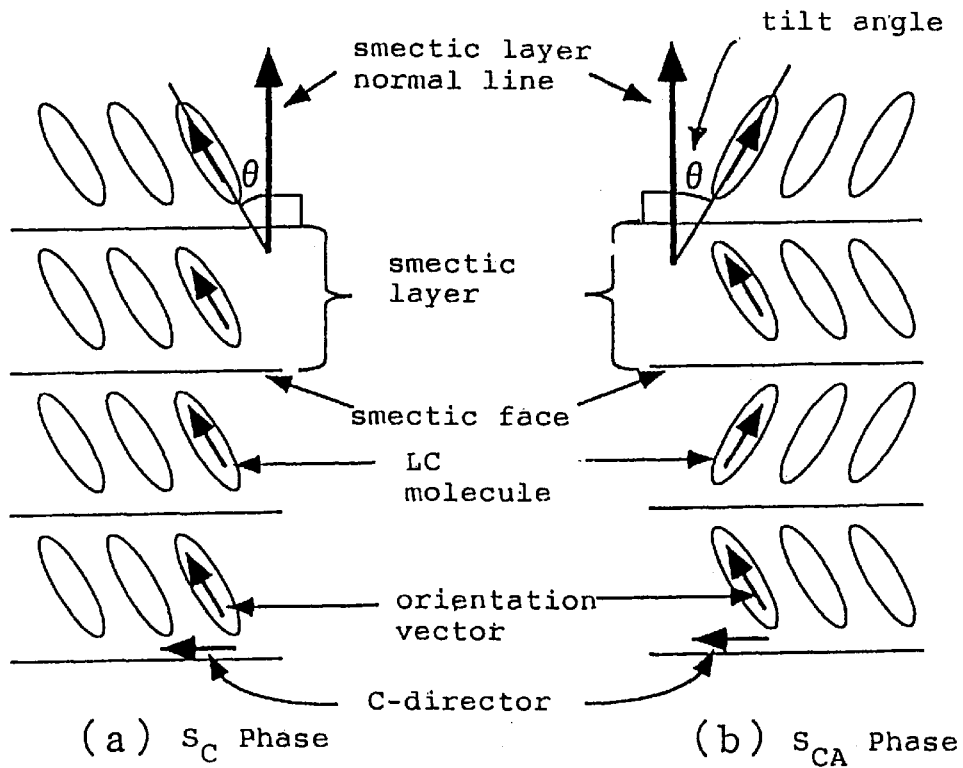
FIG. 1 is a diagram showing models of $S_C$ phase and $S_{CS}$ phase structures (orientation structures) of smectic liquid crystal.
Figure 2:
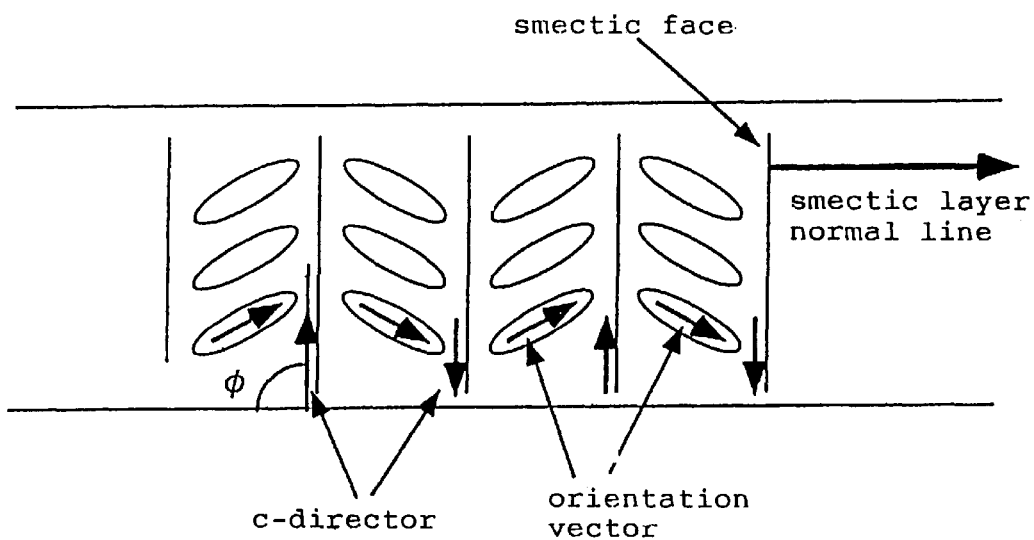
FIG. 2 is a diagram showing models of a liquid crystal phase structure (orientation structure) of a liquid crystalline polymer film according to the present invention in which the angle (φ) between C-director and film plane is 90 degrees.
Figure 3:
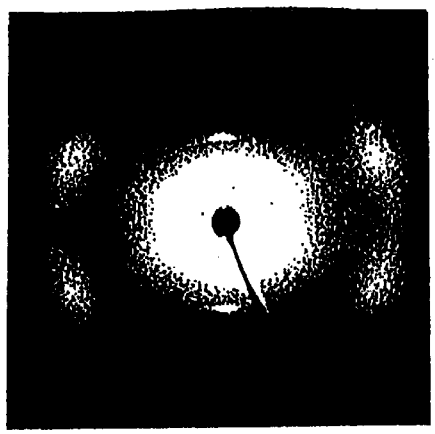
Figure 3:
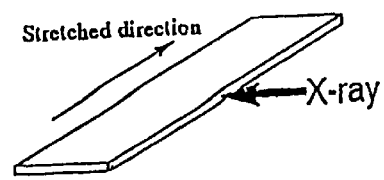
Figure 3:
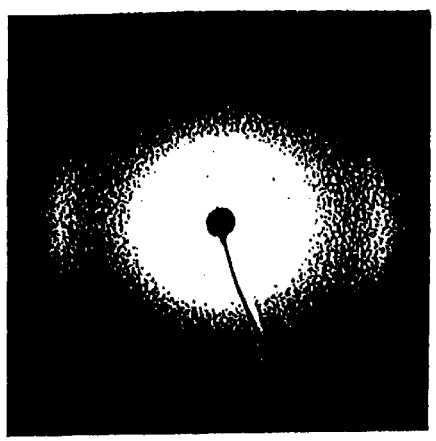
Figure 3:
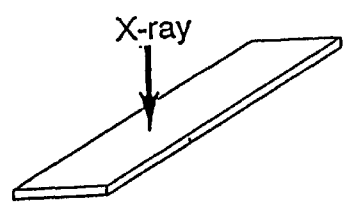
Figure 3:
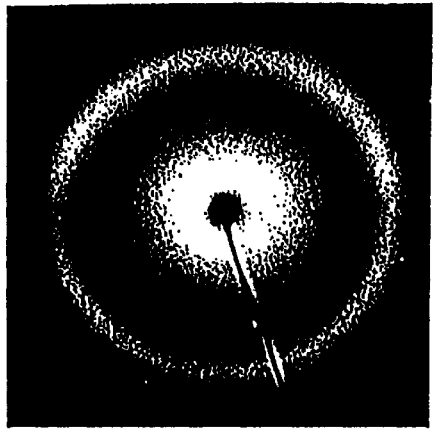
Figure 3:
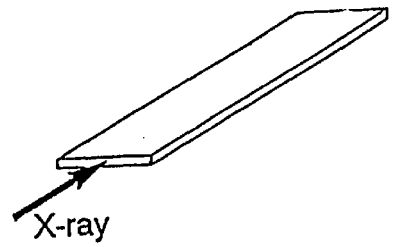
Figure 4:
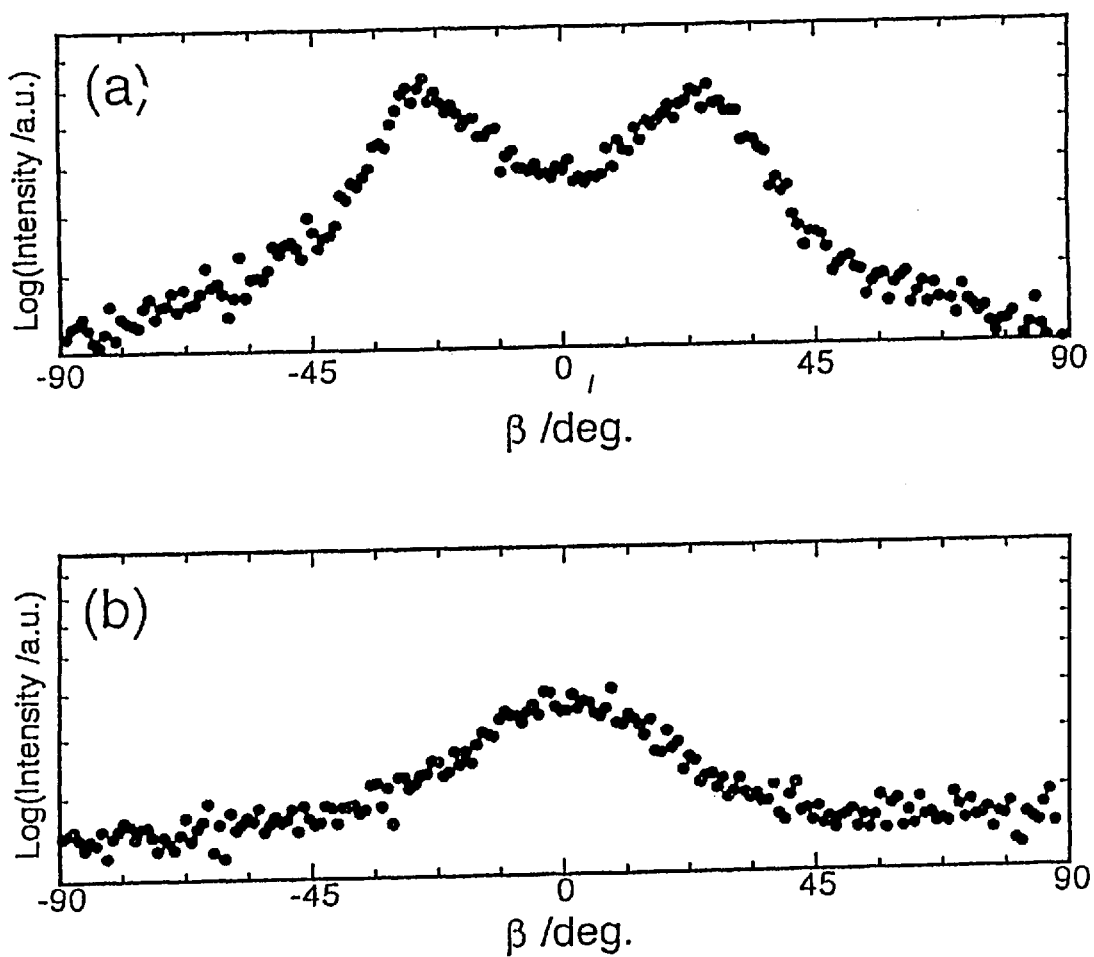

(a) is an X-ray diffraction photograph taken by applying X-ray from a side face of the film in the direction perpendicular to the stretched direction;

(b) is an X-ray diffraction photograph taken by applying X-ray in the film normal direction; and (c) is an X-ray diffraction photograph taken by applying X-ray in parallel with the stretched direction from a side face of the film; and FIG. 4 is a graph showing the results of analysis made for the liquid crystal phase structures (orientation structure) of the film obtained in Example 1, in which:

(a) shows changes in diffraction intensity according to azimuth angles observed under the condition that X-ray was radiated from a side face of the film in the direction perpendicular to the stretched direction and that the diffraction angle was set constant; and (b) shows changes in diffraction intensity according to azimuth angles observed under the condition that X-ray was radiated in the film normal direction and that the diffraction angle was set constant.

What is claimed is:

1. A liquid crystalline polymer file comprising a film formed from a liquid crystalline polymer with its orientation structure in smectic CA phase fixed, in which orientation structure the angle between C-director in the liquid crystalline polymer and the plane of said film is not zero, said liquid crystalline polymer being a main chain type liquid crystalline polymer comprising a plurality of linearly bonded aromatic groups as mesogen moiety and a plurality of straight-chain aliphatic groups as bend chain moiety.

2. A film in accordance with claim 1 wherein the angle between C-director and the plane of said film is at least 10 degrees.

3. A film in accordance with claim 1 wherein the angle between C-director and the plane of said film is at least 30 degrees.

4. A film in accordance with claim 1 wherein said film has a tilt angle of 10 to 80 degrees.

5. A film in accordance with claim 1 wherein said main chain type liquid crystalline polymer is a copolymer represented by the following general formula:

where A is said mesogen moiety which is a divalent group having 2 to 10 linearly bonded benzene rings; B is said bend chain moiety; and n is the degree of polymerization sufficient to form said film.

6. A film in accordance with claim 1 wherein said aromatic groups are diphenylene or terphenyl.

7. A film in accordance with claim 1 wherein the number of atoms of said aliphatic group contained in the main chain is an odd number.

8. A film in accordance with claim 1 wherein said film exhibits said smectic CA phase at a temperature of at least said isotropic transition temperature of said liquid crystalline polymer.

9. A film in accordance with claim 8 wherein said film exhibits said smectic CA phase at a temperature in the range of between said isotropic transition temperature of said liquid crystalline polymer and a temperature of 100° C. in excess of said isotropic transition temperature.

10. A film in accordance with claim 9 wherein said film exhibits said smectic CA phase at a temperature in the range of between said isotropic transition temperature of said liquid crystalline polymer and a temperature of 50° C. in excess of said isotropic transition temperature.

* * * * *